F. W. LANCHESTER.
BALANCING DEVICE FOR RECIPROCATING ENGINES.
APPLICATION FILED JAN. 31, 1913.
1,164,367.
Patented Dec. 14, 1915.
2 SHEETS—SHEET 2.
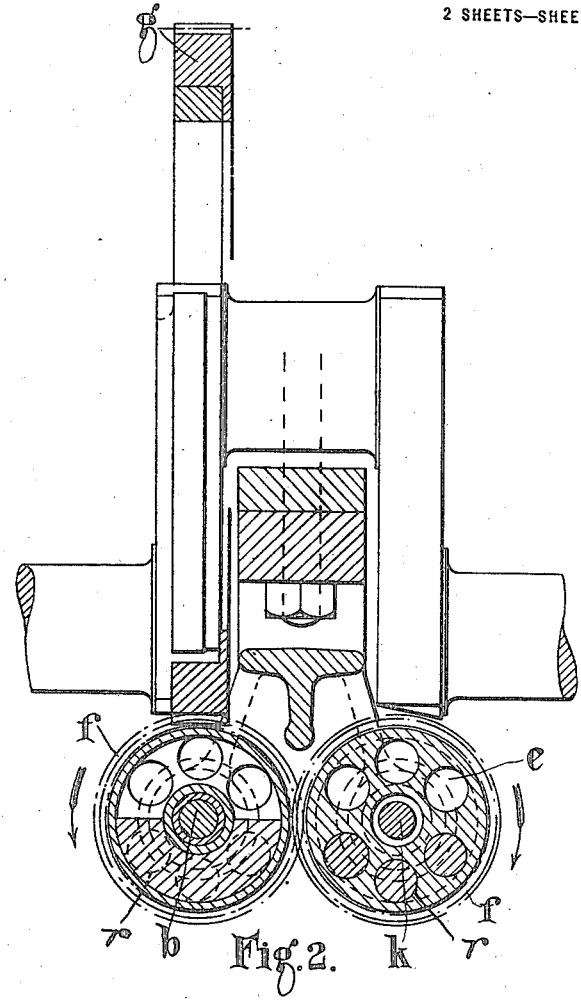
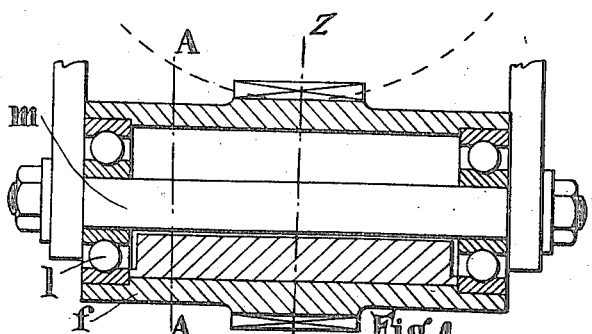
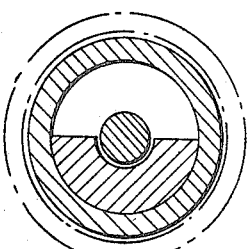
WITNESSES
INVENTOR
ATTORNEYS

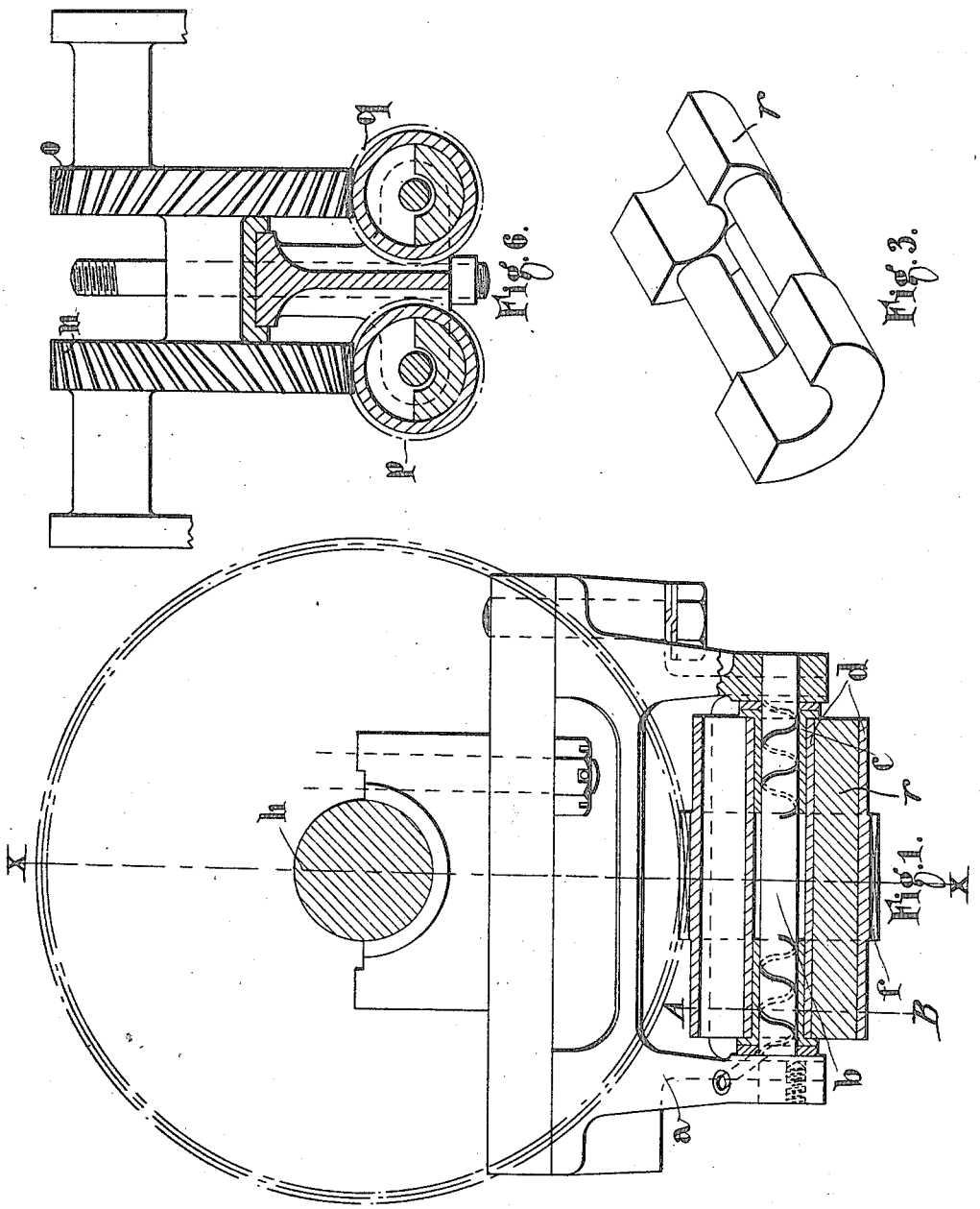

UNITED STATES PATENT OFFICE.

FREDERICK WILLIAM LANCHESTER, OF BIRMINGHAM, ENGLAND.

BALANCING DEVICE FOR RECIPROCATING ENGINES.

1,164,367. Specification of Letters Patent. Patented Dec. 14, 1915.

Application filed January 31, 1913. Serial No. 745,493.

*To all whom it may concern:*

Be it known that I, FREDERICK WILLIAM LANCHESTER, a subject of the King of Great Britain and Ireland, and residing at Edgbaston, Birmingham, in the county of Warwick, England, have invented certain new and useful Improvements Relating to Balancing Devices for Reciprocating Engines, of which the following is a specification.

The present invention relates to the balancing of reciprocating engines, and has for its object to provide improved means for balancing the linear vibration due to connecting rod angularity.

In the application for Letters Patent Serial No. 728,881 there are described various devices for eliminating secondary vibrations in reciprocating engines, and in such arrangements, according to some modifications, the linear vibration due to the connecting rod angularity is balanced by means of two oppositely rotating weights having twice the frequency of the main piston movement.

The present invention consists in mounting the rotating bob-weights in hollow sleeves capable of rotation about axes at right angles to the crankshaft axis and situated below the crankshaft.

The invention further consists in arranging the hollow sleeves carrying the weights so that one drives the other, motion being communicated to one by means of a single spiral gear wheel mounted on the crankshaft.

The invention also consists in the improved means for eliminating vibrations in reciprocating engines hereinafter described.

Referring to the accompanying drawings, Figure 1 is a transverse section at right angles to the crank shaft showing one modification of the invention; Fig. 2 is a section in a plane at right angles to the plane of Fig. 1 on the line X—X, the left-hand portion of the figure being a section on the line A—B Fig. 1; Fig. 3 is a perspective view showing the form of the weight used in the modification shown in Figs. 1 and 2; Fig. 4 is a section at right angles to the crankshaft of another modification of the invention. Fig. 5 being a cross section on the line A—A Fig. 4, while Fig. 6 is a sectional elevation on the line Z—Z Fig. 4.

In the form of the invention illustrated in Figs. 1, 2 and 3, a bracket $a$ is carried by the engine casing, and in this bracket there are fixed shafts $b$ $k$ provided with white metal bearings $c$ on which rotate weight-carrying members or carriers $d$. These members are filled in at their central portion, having a section as shown on the right-hand side of Fig. 2, a number of circular apertures $e$ being pierced through the central portion. On the outside of the central portion there is also formed a spiral gear wheel $f$. The section of the carriers at their ends is in the form of two cylinders with an open annulus between them, and half of this annulus is filled in with lead $r$, which is cast into the carrier, the form of the lead when in position being as shown in Fig. 3. A spiral gear wheel $g$ is fixed on the crankshaft $h$ and gears with one of the gear wheels $f$ on one of the carriers, and this gears with the other carrier, so that the two rotate in opposite directions carrying their weights with them at twice crankshaft speed. The direction of motion is preferably such that the teeth in contact on the two carriers are moving in the upward direction so that dirt is prevented from entering between the teeth of the two sleeves.

In the form of the invention illustrated at Figs. 4, 5 and 6, the carriers $f$ are mounted on ball bearings $l$ on the fixed shaft $m$, and in this case two spiral gear wheels $n$ $o$ are provided on the crankshaft, the carriers being separated from each other and driven independently by the spiral gear wheels $p$ $q$.

It will be seen that by oppositely rotating weights arranged as above described, the linear vibration due to connecting rod angularity may be balanced.

Having now described my invention, what I claim as new and desire to secure by Letters Patent is:—

1. In a reciprocating engine, means for balancing secondary vibrations comprising in combination, two hollow carriers, means for rotatably carrying said carriers on the engine frame, means for rotating said carriers in opposite directions, at twice crank shaft speed, and eccentrically arranged weights fixed in said carriers, as set forth.

2. In a reciprocating engine, means for balancing secondary vibrations, comprising in combination, bearings fixed to the engine frame, two spindles carried by said bearings, a sleeve mounted on each of said spindles, a weight cast eccentrically in each of said sleeves, and spiral wheels mounted on said sleeves, and geared to the crank shaft, said gears being arranged to drive said sleeves at twice crank shaft speed, as set forth.

In testimony whereof, I affix my signature in presence of two witnesses.

FREDERICK WILLIAM LANCHESTER.

Witnesses:
BERTRAM H. MATTHEWS,
E. C. WALKER.